(12) United States Patent
Dorman et al.

(10) Patent No.: US 11,391,318 B2
(45) Date of Patent: Jul. 19, 2022

(54) COMPOSITE VEHICLE DRIVESHAFT WITH WELDED JOINT SYSTEM

(71) Applicant: Composite Drivelines, LLC, West Allis, WI (US)

(72) Inventors: James Lee Dorman, West Allis, WI (US); Kai-Peter Berndt, Oak Creek, WI (US); Gregg Piper, Wauwatosa, WI (US)

(73) Assignee: Composite Drivelines, LLC, West Allis, WI (US)

( * ) Notice: Subject to any disclaimer, the term of this patent is extended or adjusted under 35 U.S.C. 154(b) by 416 days.

(21) Appl. No.: 16/373,852

(22) Filed: Apr. 3, 2019

(65) Prior Publication Data

US 2019/0301519 A1    Oct. 3, 2019

Related U.S. Application Data

(60) Provisional application No. 62/652,030, filed on Apr. 3, 2018.

(51) Int. Cl.
*F16C 3/02* (2006.01)
*F16D 3/38* (2006.01)
*B29C 65/54* (2006.01)
*B29C 65/00* (2006.01)
*B23K 101/04* (2006.01)

(52) U.S. Cl.
CPC ............ *F16C 3/026* (2013.01); *B29C 65/542* (2013.01); *B29C 66/742* (2013.01); *F16D 3/387* (2013.01); *B23K 2101/04* (2018.08); *F16C 2208/02* (2013.01); *F16C 2226/36* (2013.01); *F16C 2226/40* (2013.01); *F16C 2326/06* (2013.01); *Y10T 403/473* (2015.01)

(58) Field of Classification Search
CPC ..... F16D 3/387; B29C 65/542; B29C 66/742; Y10T 403/473; F16C 2208/02; F16C 2226/36; F16C 2226/40; F16C 2326/06; B23K 2101/04
USPC .................................. 464/181, 182; 156/294
See application file for complete search history.

(56) References Cited

U.S. PATENT DOCUMENTS

| | | |
|---|---|---|
| 2,380,952 A | 6/1943 | Dewey |
| 3,970,495 A | 7/1976 | Ashton et al. |
| 4,014,184 A | 3/1977 | Stark |
| 4,211,589 A * | 7/1980 | Fisher ...................... F16D 1/06 464/182 |
| 4,421,497 A | 12/1983 | Federmann et al. |
| 4,663,819 A | 5/1987 | Traylor |
| 4,664,644 A | 5/1987 | Kumata et al. |
| 4,722,717 A | 2/1988 | Salzman et al. |
| 4,863,416 A | 9/1989 | Gupta |

(Continued)

FOREIGN PATENT DOCUMENTS

| | | |
|---|---|---|
| DE | 3321198 | 11/1984 |
| DE | 102011109130 A1 | 2/2013 |

(Continued)

*Primary Examiner* — Greg Binda
(74) *Attorney, Agent, or Firm* — Boyle Fredrickson S.C.

(57) ABSTRACT

A composite vehicle driveshaft is provided with a composite tube and a welded joint system(s) at one or both ends of the composite tube for connecting the composite vehicle driveshaft to driveline components. Each welded joint system may include a sleeve that is bonded to an end of the composite tube and a joint assembly that is welded to the sleeve.

17 Claims, 6 Drawing Sheets

(56) References Cited

U.S. PATENT DOCUMENTS

| | | |
|---|---|---|
| 4,930,204 A | 6/1990 | Schurter |
| 4,932,924 A | 6/1990 | Löbel |
| 5,087,147 A | 2/1992 | Petrzelka et al. |
| 5,118,214 A | 6/1992 | Petrzelka |
| 5,309,620 A | 5/1994 | Shimohara et al. |
| 5,320,579 A | 6/1994 | Hoffmann |
| 5,421,781 A | 6/1995 | Mackellar |
| 5,601,493 A | 2/1997 | Nakazono et al. |
| 5,601,494 A | 2/1997 | Duggan |
| 5,632,685 A | 5/1997 | Myers |
| 5,868,517 A | 2/1999 | Aoki et al. |
| 6,193,612 B1 | 2/2001 | Craig et al. |
| 6,234,907 B1 | 5/2001 | Moser |
| 6,682,436 B2 | 1/2004 | Kimoto et al. |
| 6,692,365 B2 | 2/2004 | Suzuki et al. |
| 7,062,835 B2 | 6/2006 | Sugiyama et al. |
| 7,288,029 B1 | 10/2007 | Lyon et al. |
| 7,347,785 B2 | 3/2008 | Worman, Jr. et al. |
| 7,367,740 B2 | 5/2008 | Lazic et al. |
| 7,442,127 B2 | 10/2008 | Kai et al. |
| 7,485,045 B2 | 2/2009 | Williams |
| 7,488,257 B1 | 2/2009 | Booker et al. |
| 7,682,256 B2 | 3/2010 | Brace et al. |
| 7,946,924 B2 | 5/2011 | Neugebauer et al. |
| 8,161,619 B2 | 4/2012 | Wanthal |
| 8,246,478 B2 | 8/2012 | Schreiber et al. |
| 8,298,633 B1 | 10/2012 | Chen |
| 8,313,067 B2 | 11/2012 | Knieriem et al. |
| 8,430,759 B2 | 4/2013 | Wanthal |
| 8,597,131 B2 | 12/2013 | Pisinger |
| 8,715,093 B2 | 5/2014 | O'Neil et al. |
| 9,056,431 B2 | 6/2015 | Bond et al. |
| 10,400,826 B2 | 9/2019 | Leko |
| D896,756 S | 9/2020 | Carlini |
| 2001/0013538 A1 | 8/2001 | Drummond et al. |
| 2005/0277480 A1 | 12/2005 | Breese |
| 2007/0262066 A1 | 11/2007 | Douglass et al. |
| 2009/0116898 A1 | 5/2009 | Wanthal |
| 2013/0294824 A1 | 11/2013 | Pisinger |
| 2014/0221110 A1 | 8/2014 | Shippy et al. |
| 2015/0345540 A1 | 12/2015 | Kim |
| 2016/0123378 A1 | 5/2016 | Mintzlaff et al. |
| 2017/0051791 A1 | 2/2017 | Leko et al. |
| 2019/0185048 A1 | 6/2019 | Carlini |

FOREIGN PATENT DOCUMENTS

| | | |
|---|---|---|
| EP | 0668446 | 8/1995 |
| GB | 1018530 A | 1/1966 |
| GB | 2051306 | 1/1981 |
| JP | 6091008 A | 5/1985 |
| JP | H0560123 | 3/1993 |
| JP | 05-215119 | 8/1993 |
| JP | 06-010940 | 1/1994 |
| JP | 2017095035 | 6/2017 |
| KR | 20100107719 | 10/2010 |
| KR | 10-1881928 | 7/2018 |
| WO | 9605101 A | 2/1996 |
| WO | 2014005584 | 1/2014 |

* cited by examiner

COMPOSITE VEHICLE DRIVESHAFT WITH WELDED JOINT SYSTEM

CROSS-REFERENCE TO RELATED APPLICATIONS

This application claims the benefit of U.S. Provisional Patent Application No. 62/652,030, filed Apr. 3, 2018, hereby incorporated by reference in its entirety.

FIELD OF THE INVENTION

The invention relates generally to vehicle propel shafts or driveshafts that are made from composite materials. The invention additionally relates to a composite vehicle driveshaft with a welded joint system that allows application versatility, which may facilitate custom and other aftermarket implementations.

BACKGROUND OF THE INVENTION

Composite driveshafts are available, which have resulted from efforts to provide weight reduction for rotating assemblies. However, composite driveshafts have not been widely implemented for vehicle use. Designing composite driveshafts with composite tubes that connect to metallic components such as conventional vehicle driveline components presents numerous challenges.

The composite tubes of composite vehicle driveshafts operate in substantially different use environments than other driveshaft applications. Vehicle driveshafts operate in heat envelopes that expose them to high operating temperatures and large temperature variations, operate at high rotational speeds and with large rotational speed variations, and experience substantial torsional loading conditions such as shock-loads and/or other extreme torque spikes, and are subject to stricter diameter and other size constraints. It is difficult to design and assemble joints, fittings, or adapters to transition from the composite tubes to conventional driveline components that can maintain connection integrity with the composite tubes while handling these operating conditions and that are also sufficiently manufacturable and economical. Besides these numerous technical challenges, some driveshaft-industry companies, including various custom and other aftermarket driveshaft manufacturers and providers, as well as local driveshaft building/repair shops, are unable to produce composite driveshafts because their facilities are set up to only work with metal driveshaft components.

SUMMARY OF THE INVENTION

In accordance with a first aspect of the invention, composite vehicle driveshafts are provided that incorporate largely modular joint-to-tube adapter-type components that can be mechanically fit to each other, assembled to form weldments, units, or subassemblies and then bonded to composite tubes to form the overall composite vehicle driveshafts. This capability allows a composite tube to be implemented as a torque-transferring component of a driveshaft while providing fully metallic joints at the input and output ends of the driveshaft. The arrangement provides fabrication and application versatility, including custom and other aftermarket implementations. This capability may allow driveshaft fabrication and repair shops to build composite driveshafts without having to fabricate the composite tubes.

In accordance with another aspect of the invention, the composite vehicle driveshaft includes a composite tube with a tube sidewall that extends longitudinally between input and output ends of the tube. A welded joint system is arranged at one or both of the tube input and output ends. Each welded joint system may include a sleeve and joint assembly that are welded to each other.

In accordance with another aspect of the invention, the joint assembly may define a U-joint (universal joint). The U-joint may have an inner yoke with a yoke base collar that is concentrically arranged in the sleeve interior, with the inner yoke welded to the sleeve.

In accordance with another aspect of the invention, the sleeve is bonded to the respective one of the tube input and output ends after welding. Respective portions of the sleeve and the joint assembly may concentrically engage each other. The joint assembly may include a base with a joint assembly base collar that is concentrically connected to an outer end of the sleeve. The sleeve outer end includes a sleeve outer collar that extends past or is arranged longitudinally outward of the tube outer end, with the sleeve outer collar concentrically receiving the joint assembly base collar. When the base collar is concentrically received in the sleeve outer collar, respective portions of the sleeve in the joint assembly abut each other to define a line of abutment. The sleeve and the joint assembly may be welded to each other along the line of abutment. The weld may be a circumferential weld that extends about respective outer circumferential surfaces of the sleeve outer collar and the joint assembly base collar. The weld may fill a channel defined between respective facing surfaces of the sleeve outer collar and the joint assembly base when the joint assembly base collar is concentrically received in the sleeve outer collar. At least one of the facing surfaces that defines the weld-filled channel may be a chamfered surface so that the channel presents a wider outer opening than at the root or base of the channel before welding. Prior to welding, the channel may define a generally V-shaped opening perimeter shape when viewed in cross-section.

In accordance with another aspect of the invention, the sleeve(s) is bonded concentrically within an end(s) of the composite tube. The sleeve has a sleeve circumferential sidewall that defines a sleeve inner circumferential surface that faces toward a longitudinal axis of the composite tube. At least part of a sleeve outer circumferential surface faces toward the tube inner circumferential surface. An adhesive injection passage is configured to direct an adhesive between the sleeve outer circumferential surface and the tube inner circumferential surface during an adhesive injection procedure. An adhesive inlet may be defined at the sleeve outer collar to receive a volume of adhesive during the adhesive injection procedure. An axial injection passage segment may extend longitudinally through at least a portion of the sleeve circumferential sidewall. The axial injection passage segment is configured to convey the adhesive longitudinally through the sleeve circumferential sidewall. A radial release passage segment may extend radially through at least a portion of the sleeve circumferential sidewall to connect the axial injection passage segment to an annular cavity between the sleeve in the composite tube to release the adhesive into the annular cavity during the adhesive injection procedure. The sleeve may include a bleed passage configured to release air from the annular cavity during the adhesive injection procedure. The bleed passage may include an axial bleed passage segment, such as a bore, that extends longitudinally through at least a portion of the sleeve circumferential sidewall. A radial bleed passage segment, such as a bore, may extend radially through at least a portion of the sleeve circumferential sidewall to connect the axial bleed passage segment to the annular cavity. A bleed outlet connects the axial bleed passage segment to the ambient. The sleeve may define a passage segment that corresponds to a portion of the sleeve sidewall through which the adhesive injection and/or bleed passages extend. A non-passage segment of the sleeve corresponds to a portion of the sleeve circumferential sidewall that has no passage(s). At the non-passage segment of the sleeve, its inner circumferential surface may be inclined outwardly from an intermediate portion of the sleeve so that the sidewall at the non-passage segment gets thinner toward the end of the sleeve.

In accordance with another aspect of the invention, a method of fabricating a composite vehicle driveshaft is provided. The method includes determining a length of a composite vehicle driveshaft for a particular vehicle, which defines a composite vehicle driveshaft overall length. A length value is determined for a piece of composite tube that is required to achieve the composite vehicle driveshaft overall length. A welded joint assembly is formed by welding a joint assembly to a sleeve. The welded joint assembly is bonded to an end of the composite tube.

In accordance with another aspect of the invention, the method includes inserting a base collar of the joint assembly into the sleeve outer collar. The joint assembly may be welded to the sleeve at respective surfaces that are radially outward of the concentric interface of the joint assembly base collar and the sleeve outer collar. The sleeve may be inserted into the end of the composite tube. An adhesive may be injected into an annular cavity defined between the sleeve and the composite tube to bond the sleeve and the composite tube to each other.

Figure 1:
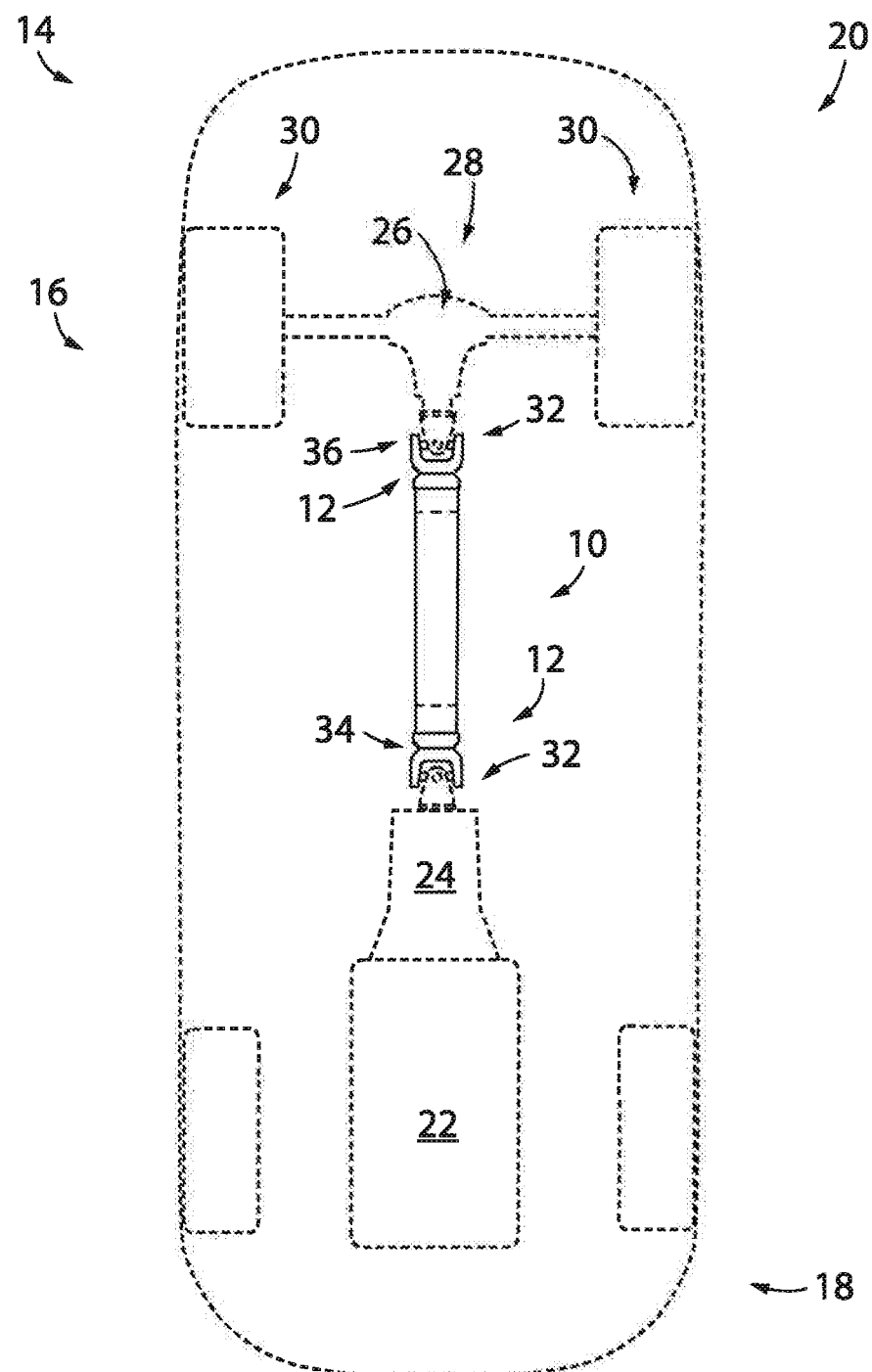
FIG. 1 schematically illustrates a vehicle with a composite vehicle driveshaft with a welded joint system in accordance with an aspect of the invention.

Before the embodiments of the invention are explained in detail, it is to be understood that the invention is not limited in its application to the details of construction and the arrangement of the components set forth in the following description or illustrated in the drawings. The invention is capable of other embodiments and of being practiced or carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF THE PREFERRED EMBODIMENTS

Referring now to the drawings and initially to FIG. 1, a composite vehicle driveshaft 10 with at least one welded joint system, shown here as a pair of welded joint systems 12 implemented in a vehicle 14, is represented here as an automobile 16. Automobile 16 has front and rear ends 18, 20 and a powertrain that includes a prime mover such as engine 22. Transmission 24 receives power from the engine 22 and delivers it downstream through the composite vehicle driveshaft 10 to a differential 26 that delivers the power through a drive axle 28 to a pair of drive wheels 30. Welded joint systems 12 are shown respectively connecting the driveshaft front end 34 to the transmission 24 and the driveshaft rear end 36 to the differential 26. It is understood that instead of the transmission 24 and differential 28, the composite vehicle driveshaft 10 may instead transmit power from the engine 22 to a transaxle that combines a transmission and drive axle.

Figure 2:
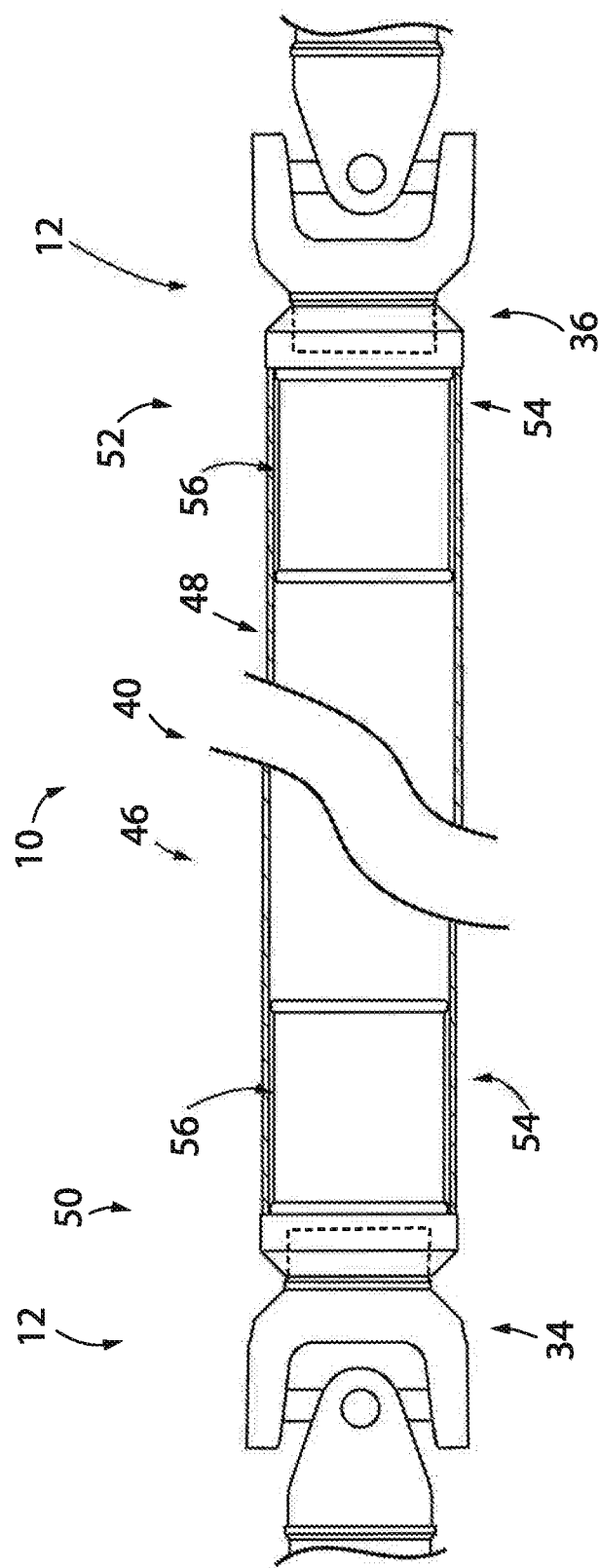
FIG. 2 schematically illustrates a partially cross-sectional side elevation view of a composite vehicle driveshaft with a welded joint system in accordance with an aspect of the invention.

Referring now to FIG. 2, composite vehicle driveshaft 10 includes a composite tube 40 that defines an intermediate portion of the composite vehicle driveshaft 10 and supports the welded joint systems 12 at its front and back ends, in this illustrated embodiment. Composite tube 40 may be a cylindrical hollow tube made from a composite material(s), including fibrous and resin materials components. Composite tube 40 has a body 46 with a circumferential tube sidewall 48 that defines a pair of ends, shown as front and rear tube ends 50, 52. The composite tube 40 may be a product of a filament winding process. The filament winding process may include wrapping or winding a filament(s) or string(s), for example, single fiber strings that are soaked in a resin around a steel or other sufficiently rigid core or mandrel. The fiber soaking may provide a wet laminate or the fiber(s) may be pre-soaked in a resin to provide what is sometimes referred to in the industry as "pre-preg materials". Regardless of the particular fiber soaking procedure, after the filament winding process, the wound filament(s) or wound tubular product is then oven-heat cured. The fibers may include, for example, carbon fiber and/or fiberglass fibers. Regardless of the particular configuration of composite tube 40, composite tube 40 has input and output ends, represented here as front and rear tube ends 50, 52 that are shown bonded to the welded joint systems 12. The bonding may connect components made of dissimilar materials to each other. This allows a non-metallic component, such as the composite tube 40, to provide a substantial or a majority portion of the length of the composite vehicle driveshaft 10 while also providing metallic component connections through the joints at the interfaces between the driveshaft front and rear ends 34, 36 and the transmission 24 and differential 28.

Still referring to FIG. 2, welded joint system 12 may be implemented as a multi-component arrangement with its components connected to each other, for example, by welding, to form a unit such as a weldment that is partially inserted into and bonded with the end(s) of the composite tube 40. Each of the welded joint systems 12 has a base 54 that may be made from a metallic material and is bonded to the respective front and rear tube ends 50, 52, such as by way of an injectable adhesive. After injection, the adhesive cures to form the bond(s) between the metallic material of base 54 and the non-metallic composite material of the composite tube 40. The bases 54 are shown as cylindrical or tubular with outer circumferential surfaces that are bonded to an inner surface of the composite tube 40. Each base 54 is shown here as a sleeve 56 that provides the connection interface between the welded joint system 12 and the composite tube 40.

Figure 3:
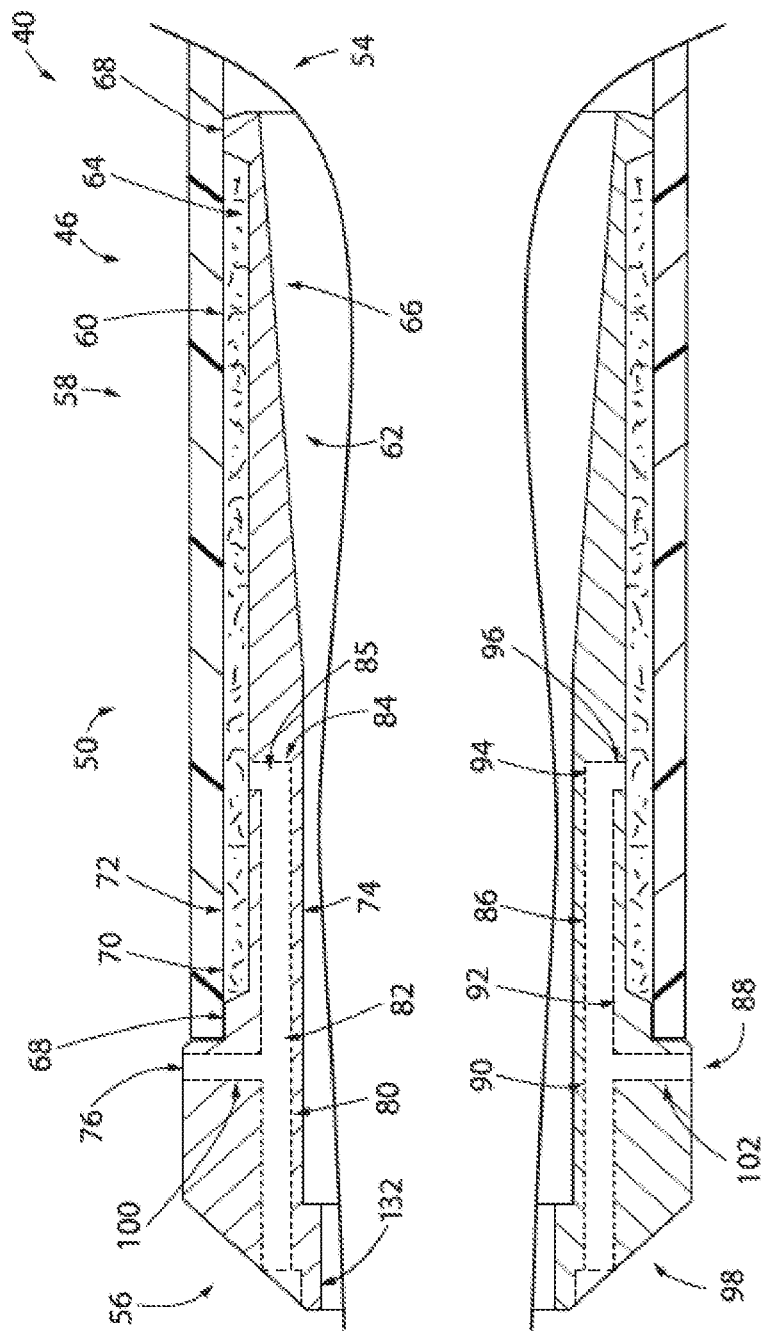
FIG. 3 schematically illustrates a partially cross-sectional side elevation view of a portion of a composite vehicle driveshaft with a welded joint system in accordance with an aspect of the invention.

Referring now to FIG. 3, portions of sleeve 56 are shown here to represent a bonded connection of the sleeve 56 or other base 54 to the composite tube 40, with the sleeve 56 fit concentrically in the front tube end 50 so that it defines a sleeve-end 58 of the composite tube with an inner circumferential surface 60 that faces toward the sleeve 56. Sleeve 56 may be aluminum or made from a ferrous metal such as steel and is a tubular member with a circumferential sidewall 62 with opposite outer and inner circumferential surfaces 64, 66. A pair of lands 68 extends radially outward from the outer circumferential surface 64, with the lands 68 longitudinally spaced from each other along the sleeve 56. The lands 68 engage the tube inner circumferential surface 60 through a snug fit, which may be an interference fit that requires press-assembly, that ensures concentricity of the sleeve 56 within the composite tube 40 by coaxially locating the sleeve within the composite tube 40 in a manner that prevents radial offset or angular tilting of the sleeve 56 with respect to a longitudinal axis of the tube 40. This concentric arrangement of the sleeve 56 within the composite tube 40 creates a space or annular cavity 70 between the tube inner circumferential surface 60 and the sleeve outer circumferential surface 64 that is filled with an adhesive 72 to bond the sleeve 56 to the composite tube 40. The adhesive 72 may be any of a variety of industrial, aerospace, or other suitable adhesives, epoxies, or other bonding agents, such as a suitable methacrylate adhesive or various one available from 3M® under Scotch-Weld™ and various other tradenames. The bond between the sleeve 56 and composite tube 40 may allow for suitable automotive applications and other high torque applications, including high performance vehicle applications that require driveshafts with high torque capacities. The bonding strength between the sleeve 56 and composite tube 40 may provide torque capacities within a range of at least about 300 lb./ft of torque capacity up to about 80,000 to 100,000 lb./ft of torque capacity of the composite vehicle driveshaft 10 without bond failure between the sleeve 56 and composite tube 40.

Still referring to FIG. 3, the adhesive 72 is introduced to fill the cavity 70 during an adhesive injection procedure. A multi-segmented passage, shown as an adhesive injection passage 74, guides the adhesive 72 from an adhesive injection tool (not shown) into the cavity 70. The adhesive injection passage 74 is shown here with an adhesive inlet 76 that defines a radial opening through the sleeve outer circumferential surface 64. Adhesive injection passage 74 includes an axial injection passage segment 80, which is shown as a bore 82 that extends longitudinally through a portion of the sleeve circumferential sidewall 62 from the outer axial end of the sleeve 56. A radial release passage segment 84 is shown as a bore 85 that extends from an inner axial end of the axial injection passage segment 80 to the cavity 70, radially through the sleeve circumferential sidewall 62.

Still referring to FIG. 3, air is vented or released from cavity 70 during the adhesive injection procedure through a bleed passage, which may be a multi-segmented passage, shown as a bleed passage 86 that may be identical to but circumferentially spaced from the adhesive injection passage 74. Bleed passage 86 includes a bleed outlet 88 that defines an opening through the sleeve's outer circumferential surface 64 and connects and vents the bleed passage 86 to the ambient. Bleed passage 86 includes an axial bleed passage segment 90, which is shown as a bore 92 that extends longitudinally through a portion of the sleeve's circumferential sidewall 62 that extends from the outer axial end of the sleeve 56. A radial bleed passage segment 94 is shown as a bore 96 that extends from an inner axial end of the axial bleed passage segment 90 to the cavity 70, radially through the sleeve's circumferential sidewall 62. The adhesive injection passage 74 and bleed passage 86 may be peripherally offset from one another by 180° to optimize bleeding from the cavity 70 and thus adhesive filling of the cavity 70. Alternatively, or instead of this arrangement, two or more opposed bleed passages could be provided that are each spaced in opposite directions about 150° to 175° from the adhesive injection passage 74.

Sleeve 56 is shown with a flange or larger diameter portion, shown here as sleeve outer collar 98 that is arranged longitudinally outward of the composite tube 40. Outer base collar 98 presents an outer circumferential surface that is wide enough to mount weld-on or other balancing weights for rotationally balancing the composite vehicle driveshaft 10 (FIG. 1). An adhesive inlet radial passage 100 extends radially through the sleeve outer collar 98 between the adhesive inlet 76 and the axial injection passage segment 80. A bleed outlet radial passage 102 extends radially through the sleeve outer collar 98 between the bleed outlet 88 and the axial bleed passage segment 90.

Figure 4:
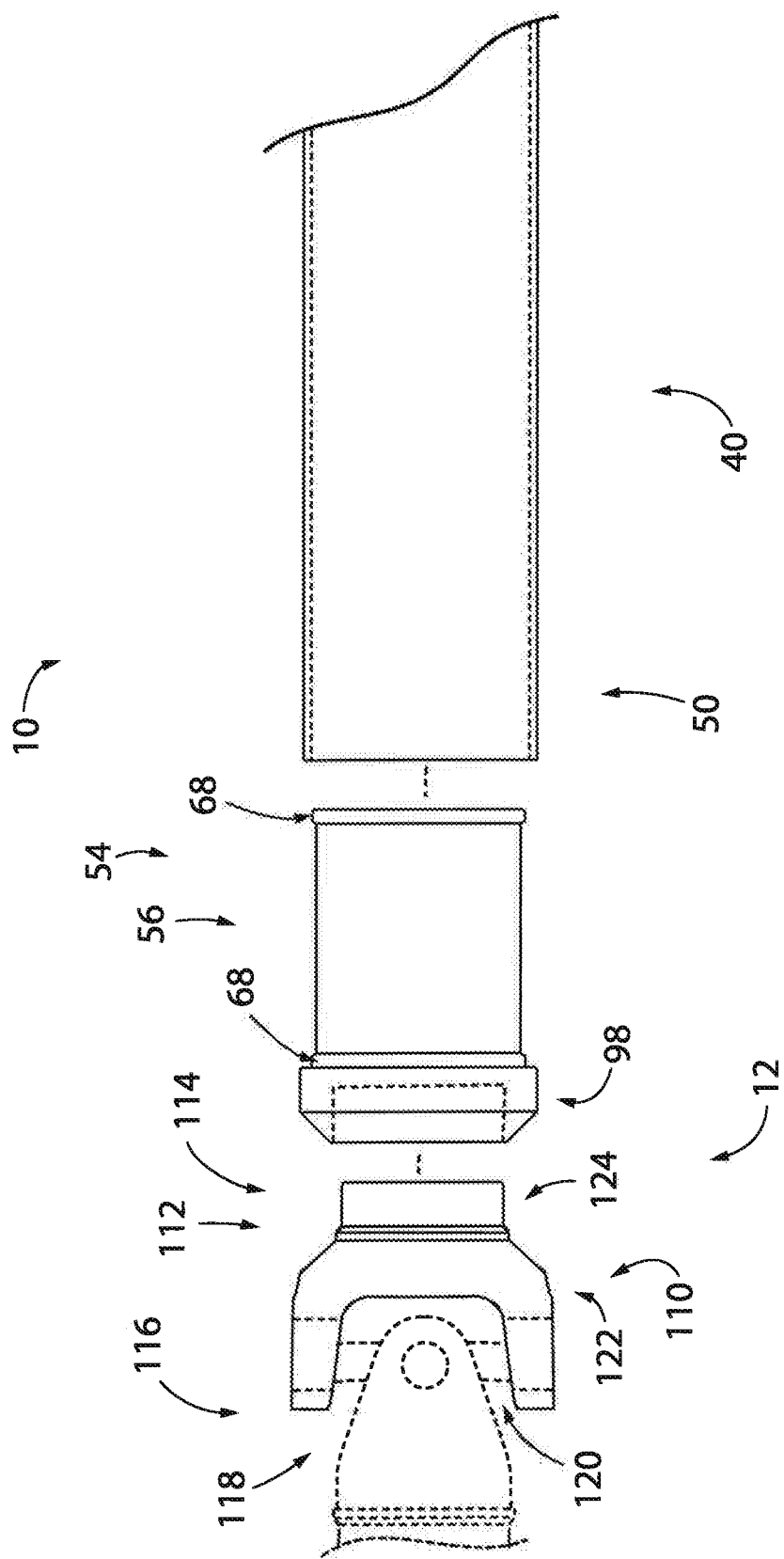
FIG. 4 schematically illustrates an exploded side elevation view of a portion of a composite vehicle driveshaft with a welded joint system in accordance with an aspect of the invention.

Referring now to FIG. 4, the sleeve 56, or other base that is bonded to the composite tube 40, is fixed such as by welding to a joint assembly 110 of the welded joint system 12. The welded joint system 12 is represented here in a disassembled state prior to welding its respective components to each other and its bonding to the composite shaft 40. The joint assembly 110 has a base 112 with a base collar 114 concentrically connected to an outer end of the sleeve 56. The joint assembly 110 is shown here having a U-joint (universal joint) 116, although it is contemplated that the joint assembly 110 may be implemented as a CV (constant velocity) joint or other driveline-type joint to facilitate connecting the composite driveshaft 10 to respective vehicle components. The U-joint 116 has an outer yoke 118 that is connected to another driveline component and a journal cross or trunnion 120. The trunnion 120 and corresponding bearings (not shown) connect the outer yoke 118 to an inner yoke 122. Inner yoke 122 has a base collar 124, shown here defined by the joint assembly base collar 114. In the assembled welded joint system 12, the inner yoke base collar 124 is inserted inside of the sleeve 56.

Figure 5:
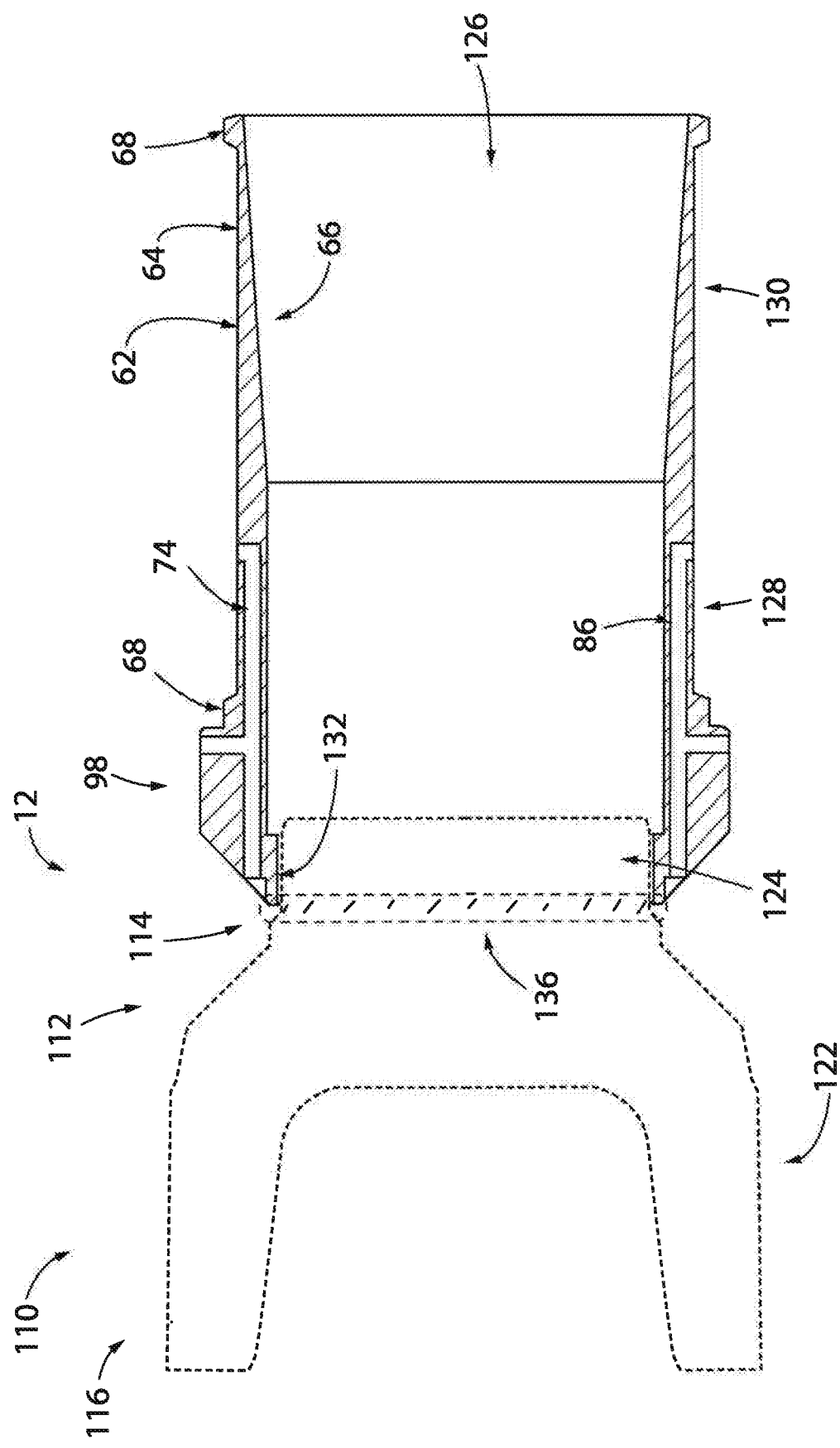
FIG. 5 schematically illustrates a partially cross-sectional side elevation view of another portion of a composite vehicle driveshaft with a welded joint system in accordance with an aspect of the invention.

Referring now to FIG. 5, inside of sleeve 56, an interior space is defined by a bore 126 that has different diameters at different locations along its length, with the inner circumferential surface 66 presenting different angled or stepped surfaces at different locations along the length of the sleeve 56. The adhesive injection and bleed passages 86 extend along only part of the length of the sleeve 56, which defines a passage segment 128, toward the sleeve 56 outer end. A non-passage segment 130 of the circumferential sidewall 62 corresponds to a portion of the sleeve circumferential sidewall 62 that has no passage(s) along its length, toward the sleeve 56 inner end. At the non-passage segment of the sleeve circumferential sidewall 62, its inner circumferential surface 66 may be inclined outwardly from an intermediate portion of the sleeve 56 so that the sidewall 62 at the non-passage segment gets thinner toward the inner end of the sleeve 56. The inclined surface of the non-passage segment 130 may extend outwardly at an angle of about 4° or between about 2° to 6° or between about 2° to 10° with respect to the inner circumferential surface of the bore of the adjacent passage segment 128, toward the thinner end of the sleeve sidewall 62. Toward the outer end of the sleeve 56, an internal collar 132 extends radially into and circumferentially around the inside of the sleeve 56. The internal collar 132 concentrically receives the inner yoke base collar 124, which radially locates the joint assembly 110 with respect to the sleeve 56. The fit of the inner yoke base and sleeve internal collars 124, 132 provides a concentric mechanical coupling of the joint assembly 110 inside the sleeve 56, and a weld 136 provides a welded or fused attachment of the joint assembly 110 and the sleeve 56 outside of the sleeve 56 and furthermore seals the outer passage 86 to prevent adhesive to exit prematurely to ambient before filling the cavity 70.

Figure 6:
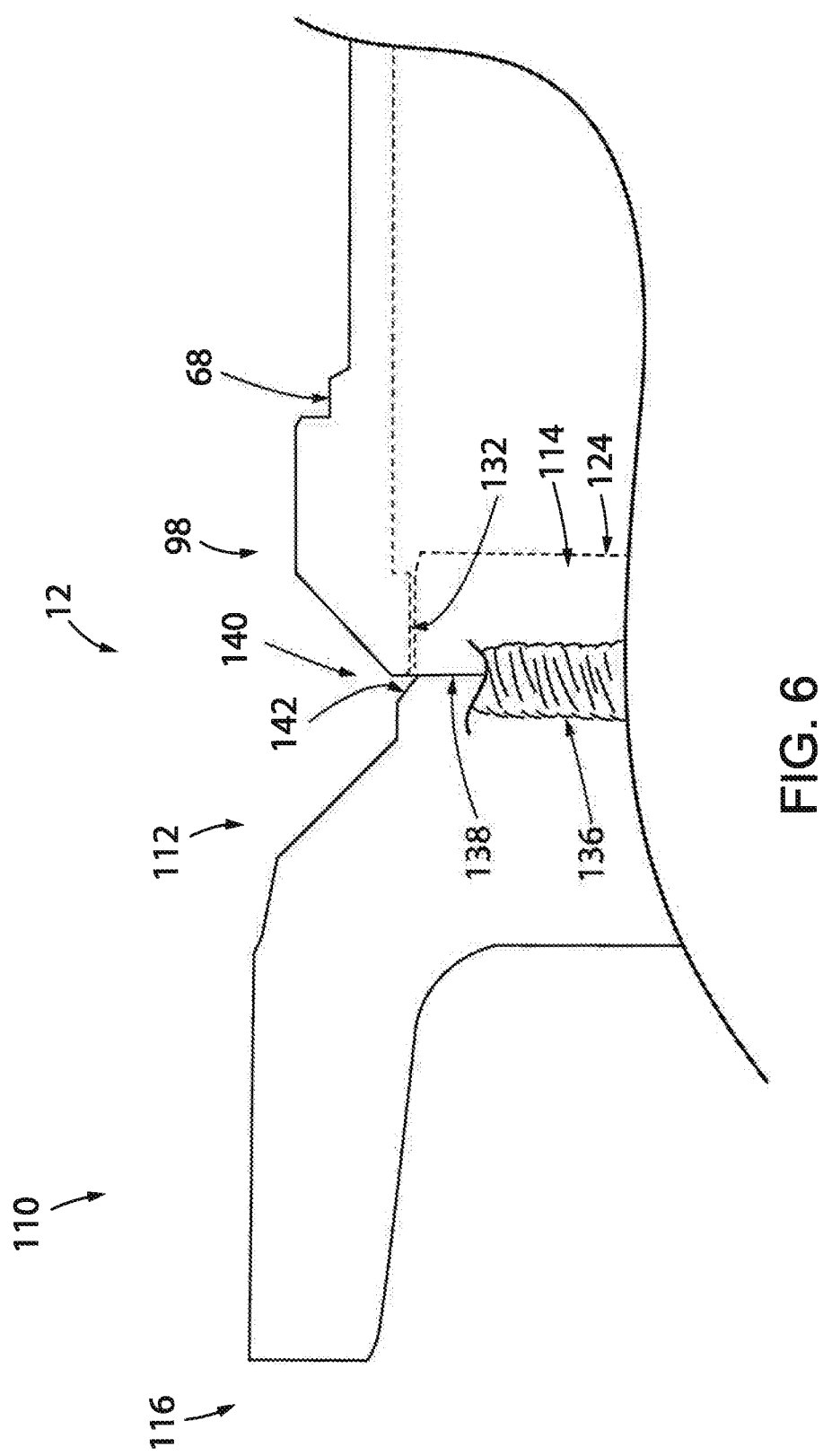
FIG. 6 schematically illustrates a partially cross-sectional side elevation view of another portion of a composite vehicle driveshaft with a welded joint system in accordance with an aspect of the invention.

Referring now to FIG. 6, when the joint assembly base collar 114 is concentrically received in the sleeve outer collar 98, respective portions of the sleeve 56 and the joint assembly 110 abut each other to define a line of abutment 138. The sleeve 56 and the joint assembly 110 are shown here welded to each other along the line of abutment with weld 136. The weld 136 may be a circumferential weld that extends about respective outer circumferential surfaces of the sleeve outer collar 98 and the joint assembly base collar 114. The weld 136 may fill a channel 140 defined between respective facing surfaces of the sleeve outer collar 98 and the joint assembly base 112 when the joint assembly base collar 114 is concentrically received in the sleeve outer collar 98. At least one of the facing surfaces that defines the weld-filled channel may be a chamfered surface 142 so that the channel presents a wider outer opening than at the root or base of the channel before welding. Prior to welding, the channel may define a generally V-shaped opening perimeter shape when viewed in cross-section.

Many changes and modifications could be made to the invention without departing from the spirit thereof. The scope of these changes will become apparent from the appended claims.

What is claimed is:

1. A composite vehicle driveshaft that defines a driveshaft input end that receives power from a vehicle prime mover and an output end that delivers power toward vehicle drive wheels, the composite vehicle driveshaft comprising:
   a composite tube having:
      a tube input end defined toward the driveshaft input end;
      a tube output end defined toward the driveshaft output end; and
      a tube sidewall that extends longitudinally between the tube input and output ends;
   wherein at least one of the driveshaft input and output ends includes a welded joint system having:
      a sleeve that is concentrically attached to a respective one of the tube input and output ends and defining a cavity between respective surfaces of the sleeve and the tube sidewall;
      a passage that extends through the sleeve and that is configured to direct a volume of adhesive into the cavity during an adhesive injection procedure; and
      a joint assembly welded to the sleeve.

2. The composite vehicle driveshaft of claim 1, wherein the sleeve is bonded to the respective one of the tube input and output ends.

3. The composite vehicle driveshaft of claim 2, wherein respective portions of the sleeve and the joint assembly concentrically engage each other.

4. The composite vehicle driveshaft of claim 3, wherein the sleeve defines a sleeve inner end that faces toward a middle segment of the composite tube and an outer end that faces away from the middle segment of the composite tube, and
   wherein the joint assembly includes a base with a joint assembly base collar that is concentrically connected to the sleeve outer end.

5. The composite vehicle driveshaft of claim 4, wherein the joint assembly base collar is concentrically received in the composite tube outer end.

6. The composite vehicle driveshaft of claim 4, wherein the sleeve outer end includes a sleeve outer collar arranged longitudinally outward of the tube outer end; and
   wherein the joint assembly base collar is concentrically received in the sleeve outer collar.

7. The composite vehicle driveshaft of claim 6, wherein when the base collar is concentrically received in the sleeve outer collar, respective portions of the sleeve in the joint assembly abut each other to define a line of abutment and wherein the sleeve and the joint assembly are welded to each other along the line of abutment.

8. The composite vehicle driveshaft of claim 7, wherein the weld is a circumferential weld that extends about respective outer circumferential surfaces of the sleeve outer collar and the joint assembly base collar.

9. The composite vehicle driveshaft of claim 8, wherein the weld fills a channel defined between respective facing surfaces of the sleeve outer collar and the joint assembly base when the joint assembly base collar is concentrically received in the sleeve outer collar.

10. The composite vehicle driveshaft of claim 9, wherein at least one of the respective facing surfaces of the sleeve outer collar and the joint assembly base is defined as a chamfered surface.

11. The composite vehicle driveshaft of claim 2, wherein the joint assembly defines a U-joint (universal joint) with an inner yoke that is welded to and extends outwardly beyond the sleeve and wherein the inner yoke includes a yoke base collar that is concentrically arranged in an interior of the sleeve.

12. The composite vehicle driveshaft of claim 2, wherein:
   the tube sidewall defines a tube outer circumferential surface and a tube inner circumferential surface;
   the sleeve includes a sleeve circumferential sidewall that defines a sleeve inner circumferential surface that faces toward a longitudinal axis of the composite tube and a sleeve outer circumferential surface;
   the cavity is defined by an annular cavity arranged between the sleeve outer circumferential surface and the tube inner circumferential surface as the respective surfaces of the sleeve and the tube sidewall;
   the sleeve is bonded concentrically within the respective one of the tube input and output ends; and
   the adhesive injection passage is configured to direct the volume of adhesive between the sleeve outer circumferential surface and the tube inner circumferential surface during the adhesive injection procedure.

13. A composite vehicle driveshaft that defines a driveshaft input end that receives power from a vehicle prime mover and an output end that delivers power toward vehicle drive wheels, the composite vehicle driveshaft comprising:
   a composite tube having:

a tube input end defined toward the driveshaft input end;

a tube output end defined toward the driveshaft output end; and a tube sidewall that extends longitudinally between the tube input and output ends;

wherein at least one of the driveshaft input and output ends includes a welded joint system having:

a sleeve that is concentrically attached to a respective one of the tube input and output ends; and a joint assembly welded to the sleeve;

wherein:

the sleeve is bonded to the respective one of the tube input and output ends the tube defines a tube inner circumferential surface, and the sleeve is bonded concentrically within the respective one of the tube input and output ends and wherein the sleeve comprises:

a sleeve circumferential sidewall that defines a sleeve inner circumferential surface that faces toward a longitudinal axis of the composite tube and a sleeve outer circumferential surface with at least part of the sleeve outer circumferential surface facing toward the tube inner circumferential surface and defining an annular cavity therebetween; and an adhesive injection passage configured to direct an adhesive between the sleeve outer circumferential surface and the tube inner circumferential surface during an adhesive injection procedure;

the sleeve outer end includes a sleeve outer collar arranged longitudinally outward of the tube outer end, and the adhesive injection passage includes:

an adhesive inlet defined at the sleeve outer collar and that is configured to receive a volume of adhesive during the adhesive injection procedure;

an axial injection passage segment that extends longitudinally through at least a portion of the sleeve circumferential sidewall and is configured to convey the volume of adhesive in a longitudinal direction through the sleeve circumferential sidewall; and a radial release passage segment that extends radially through at least a portion of the sleeve circumferential sidewall to connect the axial injection passage segment to the annular cavity to release the volume of adhesive from the axial passage into the annular cavity during the adhesive injection procedure.

14. The composite vehicle driveshaft of claim 13, wherein the sleeve further comprises a bleed passage configured to release air from the annular cavity during the adhesive injection procedure.

15. The composite vehicle driveshaft of claim 14, wherein the bleed passage includes:

an axial bleed passage segment that extends longitudinally through at least a portion of the sleeve circumferential sidewall;

a radial bleed passage segment that extends radially through at least a portion of the sleeve circumferential sidewall to connect the axial bleed passage segment to the annular cavity; and a bleed outlet that connects the axial bleed passage segment to the ambient.

16. The composite vehicle driveshaft of claim 15, wherein the sleeve defines a passage segment corresponding to a portion of the sleeve circumferential sidewall through which at least one of the adhesive injection and bleed passages extends and is defined toward the sleeve outer end; and a non-passage segment corresponding to a portion of the sleeve circumferential sidewall to which the at least one of the adhesive injection and bleed passages does not extend and is defined toward the sleeve inner end, and wherein the sleeve inner circumferential surface angles outwardly from a location adjacent the passage segment so that a thickness dimension of the sleeve circumferential sidewall is smaller at the sleeve inner end than at the sleeve outer end.

17. A vehicle comprising:

a drive train including a composite vehicle driveshaft, wherein the composite driveshaft includes:

a composite tube having opposed tube ends;

a welded joint system having:

a sleeve that is arranged concentrically in a respective one of the tube ends, wherein:

a cavity is defined between respective surfaces of the sleeve and the respective one of the tube ends a passage that extends through the sleeve and that is configured to direct a volume of adhesive into the cavity during an adhesive injection procedure; and a joint assembly that is welded to the sleeve and that is configured to attach the composite driveshaft to an upstream or a downstream drivetrain component.

* * * * *